US009444842B2

(12) United States Patent
Porras et al.

(10) Patent No.: US 9,444,842 B2
(45) Date of Patent: Sep. 13, 2016

(54) SECURITY MEDIATION FOR DYNAMICALLY PROGRAMMABLE NETWORK

(71) Applicant: SRI International, Menlo Park, CA (US)

(72) Inventors: Phillip A. Porras, Cupertino, CA (US); Martin W. Fong, Redwood City, CA (US); Vinod Yegneswaran, Foster City, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 131 days.

(21) Appl. No.: 13/801,855

(22) Filed: Mar. 13, 2013

(65) Prior Publication Data

US 2014/0075519 A1  Mar. 13, 2014

Related U.S. Application Data

(60) Provisional application No. 61/650,287, filed on May 22, 2012.

(51) Int. Cl.
H04L 29/06 (2006.01)
(52) U.S. Cl.
CPC ............ *H04L 63/20* (2013.01); *H04L 63/107* (2013.01); *H04L 63/126* (2013.01)
(58) Field of Classification Search
CPC ... H04L 63/107; H04L 63/20; H04L 63/126; H04L 63/08; H04L 47/10; H04L 29/06823; H04L 47/2441; H04L 49/10
See application file for complete search history.

(56) References Cited

U.S. PATENT DOCUMENTS

| 6,381,639 | B1 * | 4/2002 | Thebaut et al. | 709/222 |
| 7,757,276 | B1 * | 7/2010 | Lear | 726/6 |
| 2005/0278431 | A1 * | 12/2005 | Goldschmidt et al. | 709/207 |
| 2006/0069590 | A1 * | 3/2006 | Fox et al. | 705/1 |
| 2007/0162966 | A1 * | 7/2007 | Agrawal et al. | 726/6 |
| 2008/0289026 | A1 * | 11/2008 | Abzarian et al. | 726/11 |
| 2009/0023431 | A1 * | 1/2009 | Sim et al. | 455/418 |
| 2011/0261825 | A1 * | 10/2011 | Ichino | 370/400 |
| 2011/0317559 | A1 * | 12/2011 | Kern et al. | 370/235 |
| 2012/0008629 | A1 * | 1/2012 | Chiba | H04L 45/34 370/392 |
| 2013/0311675 | A1 * | 11/2013 | Kancherla | 709/244 |
| 2013/0347059 | A1 * | 12/2013 | Fong et al. | 726/1 |
| 2014/0033275 | A1 * | 1/2014 | Kawamoto | 726/3 |
| 2014/0059225 | A1 * | 2/2014 | Gasparakis et al. | 709/226 |

(Continued)

OTHER PUBLICATIONS

Porras, Phillip, et al., "A Security Enforcement Kernel for OpenFlow Networks," HotSDN'12, Aug. 13, 2012, 6 pages.

(Continued)

*Primary Examiner* — Farid Homayounmehr
*Assistant Examiner* — Christopher C Harris
(74) *Attorney, Agent, or Firm* — Barnes & Thornburg LLP

(57) ABSTRACT

A network security policy may be implemented at network switches as a set of active packet disposition directives. In a dynamically programmable network, the network switches can be dynamically reprogrammed with new packet disposition directives. A security mediation service permits such dynamic reprogramming as long as the new directives are consistent with the then-current network security policy. The security mediation service evaluates candidate packet disposition directives for conflicts with the currently active security policy, before instantiating the candidate packet disposition directives at the network switches.

19 Claims, 6 Drawing Sheets

(56) References Cited

U.S. PATENT DOCUMENTS

| | | | | |
|---|---|---|---|---|
| 2014/0098678 A1* | 4/2014 | Lumezanu | .......... | H04L 43/0876 370/248 |
| 2015/0023147 A1* | 1/2015 | Lee | .......... | H04L 45/38 370/216 |
| 2015/0172208 A1* | 6/2015 | DeCusatis | .......... | H04L 47/70 709/226 |
| 2015/0350156 A1* | 12/2015 | Ma | .......... | H04L 43/00 709/245 |

OTHER PUBLICATIONS

Porras, Phillip, "Empowering Dynamic Network Defenses Across OpenFlow Networks," SDN Security Seminars 2012, Feb. 28, 2012, 26 pages.

Porras, Phillip, et al., "An Overview of the FortNOX Security Kernel," available at http://www.openflowsec.org/, 29 pages.

Chua, Roy, "Interview with Phil Porras: Lack of Secure Controller Hurting OpenFlow?" Jul. 3, 2012, available at http://www.sdncentral.com/sdn-blog/phil-porras-openflow-secure-controller/2012/07/, printed Jun. 12, 2013, 11 pages.

Chua, Roy, "SDN Security—An Oxymoron? New Interview with Phil Porras of SRI International," Feb. 26, 2013, available at http://www.sdncentral.com/sdn-blog/sdn-security-oxymoron-phil-porras-sri/2013/02/, printed Jun. 12, 2013, 9 pages.

Shin, Seugwon, et al., "FRESCO: Modular Composable Security Services for Software-Defined Networks," ISOC Network and Distributed System Security Symposium, Feb. 2013, 16 pages.

Porras, Phillip, "OpenFlowSec.org Demonstration Videos," video material available at http://www.openflowsec.org/OpenFlow_Security/Demo_Vids.html, 7 pages.

Ferro, Greg, "OpenFlow vs. Traditional Networks," InformationWeek Reports, Jan. 2012, 13 pages.

Sherwood, Rob, et al., "FlowVisor: A Network Virtualization Layer," available at http://openflowswitch.org/downloads/technicalreports/open-flow-tr-2009-1-flowvisor.pdf, Oct. 14, 2009, 15 pages.

\* cited by examiner

SECURITY MEDIATION FOR DYNAMICALLY PROGRAMMABLE NETWORK

CROSS-REFERENCE TO RELATED APPLICATION

This application claims the benefit of and priority to U.S. Provisional Patent Application Ser. No. 61/650,287, filed May 22, 2012, which is incorporated herein by this reference in its entirety.

GOVERNMENT RIGHTS

This invention was made in part with government support under contract number W911NF-06-1-0316 awarded by the Army Research Office. The Government has certain rights in this invention.

BACKGROUND

Software-defined networking refers to an approach to building a computer network that allows for programmable network switch infrastructures, in which the rules that determine how the network switches are to process network flows can be dynamically specified and changed. Such programmability is useful, for instance, in the management of virtual computing resources that may be spawned or terminated on demand. The OPENFLOW network model is one example of a protocol that may be used to implement software-defined networking.

According to traditional notions of network perimeter defense, network security may be provided by a well-defined (e.g., static) security policy that can be instantiated for a particular network topology. In traditional network environments, the security policy often can be deployed and enforced consistently across the network infrastructure.

SUMMARY

According to at least one embodiment of this disclosure, a security mediation service to enforce a security policy at an interface to a network switch of a dynamically programmable computer network, embodied in a computing system coupled to the network, includes a source authenticator to authenticate a source of a packet disposition directive that may be implemented by the network switch to control the flow of communications across the network, where the source includes one of a network administrator and a software application; and a conflict analyzer to determine whether to implement the packet disposition directive at the network switch based on one or more of a role associated with the source of the packet disposition directive and a capability associated with the source of the packet disposition directive.

The conflict analyzer may compare the role of the source of the packet disposition directive to roles that are associated with the sources of currently active packet disposition directives that currently control the flow of communications across the network, and may determine whether the packet disposition directive should be implemented at the network switch based on whether the role of the source of the packet disposition directive has a higher priority than the roles of the sources of the currently active packet disposition directives. The role may be determined based at least in part on whether the source is a network administrator, a network security application, or another type of software application.

The capability may be based at least in part on whether the packet disposition directive is signed with a digital signature.

The source authenticator may use a public key to authenticate the source of the packet disposition directive and the capability may be based at least in part on whether the source of the packet disposition directive is authenticated. The role may be based at least in part on a communication channel used to communicate the packet disposition directive to the security mediation service. The role may be based at least in part on a process from which the packet disposition directive originated. The security mediation service may communicate the packet disposition directive to the network switch if the security mediation service determines that the packet disposition directive should be implemented at the network switch.

The network may include a plurality of network switches and the security mediation service may coordinate the communication of the packet disposition directive to the plurality of network switches. The security mediation service may communicate the packet disposition directive to all of the network switches before it communicates the packet disposition directive to a switch from which a communication was received that triggered the packet disposition directive. The network switches may each have a local flow table and the security mediation service may insert the packet disposition directive in each of the local flow tables if the security mediation service determines that the packet disposition directive should be implemented at the network switches. The security mediation service may include a security directive translator to prepare the packet disposition directive based on a network security policy associated with the source. The security mediation service may include a state table manager to maintain consistency between an aggregate table of currently active packet disposition directives across a plurality of network switches including the network switch and a local table of flow rules resident at the network switch. The security mediation service may include a switch manager to communicate messages relating to the status of the local table of flow rules to the security mediation service.

The conflict analyzer may determine whether the packet disposition directive conflicts with one or more currently active packet disposition directives that currently control the flow of communications across the network. The packet disposition directive may include one or more of: a directive to enable or disable one or more ports of the network switch, a directive to request the network switch to generate network traffic in response to a specified network condition, a flow rule to control network flows at the network switch, and another type of directive that may change the behavior or configuration of the network switch. One or more embodiments of the security mediation service may include any combination of any of the foregoing aspects of the security mediation service.

According to at least one embodiment of this disclosure, a network controller may be embodied in one or more machine accessible storage media and may be configured to interface with software applications and with the network switch, and the network controller may include any combination of any of the foregoing aspects of the security mediation service.

According to at least one embodiment of this disclosure, a network virtualization layer may be embodied in one or more machine accessible storage media and may be configured to interface with software applications and with the network switch, and the network virtualization layer may include any combination of any of the foregoing aspects of the security mediation service.

According to at least one embodiment of this disclosure, a method for enforcing a security policy at an interface to a network switch of a dynamically programmable computer network, includes, with a computing system coupled to the network: receiving a packet disposition directive from the network, where the packet disposition directive may be implemented by the network switch to effect a change in the behavior or configuration of the network switch; determining a role associated with the packet disposition directive; determining whether the packet disposition directive conflicts with a currently active network security policy, where the currently active security policy currently controls the behavior and configuration of the network switch; and in response to determining that the packet disposition directive conflicts with the currently active network security policy, determining whether to implement the packet disposition directive at the network switch based on the role associated with the packet disposition directive.

The method may include determining whether a digital signature is associated with the packet disposition directive. The method may include, in response to determining that a digital signature is associated with the packet disposition directive, analyzing the digital signature associated with the packet disposition directive and determining a capability associated with the packet disposition directive based on the analysis of the digital signature, where the capability determines whether the packet disposition directive may effect a change in the behavior or configuration of the network switch. The method may include determining a communication channel associated with the packet disposition directive and determining the role based on the communication channel. The method may include identifying a source of the packet disposition directive and determining the role based on the identity of the source. Embodiments of the method may include any combination of any of the foregoing aspects of the method.

According to at least one embodiment of this disclosure, a method for enforcing a security policy at an interface to a network switch of a dynamically programmable computer network includes, with a computing system coupled to the network: identifying a source of one or more packet disposition directives, where the packet disposition directives may be implemented by the network switch to effect changes in the behavior or configuration of the network switch; verifying the identity of the source using an authentication technique; assigning a role to the source based at least in part on whether the source is a network administrator or a software application, where the role includes information that may be used to determine whether packet disposition directives produced by the source may be implemented by the network switch; and storing the role for use in evaluating packet disposition directives for implementation by the network switch.

The method may include determining the role based on whether the source is a network administrator, a network security application, or another type of software application. The role may have a lower priority if the source is a network security software application than if the source is a network administrator. The role may have a higher priority if the source is a network security software application than if the source is another type of software application. The role may have a higher priority if the source has a digital signature. The method may include determining a communication channel associated with the source and assigning the role based on the communication channel. The method may include determining a process associated with the source and assigning the role based on the process. The method may include assigning a capability to the source that allows the source to issue packet disposition directives to modify the configuration or behavior of the network switch, in response to authenticating the identity of the source. Embodiments of the method may include any combination of any of the foregoing aspects of the method.

According to at least one embodiment of this disclosure, a method for enforcing a security policy at an interface to a network switch of a dynamically programmable computer network includes, with a computing system coupled to the network: receiving a packet disposition directive from the network, the packet disposition directive comprising a candidate flow rule that may be implemented by the network switch to control the flow of communications across the network; determining whether the candidate flow rule conflicts with one or more flow rules in a set of currently active flow rules, where the currently active flow rules currently control the flow of communications across the network; and in response to determining that the candidate flow rule does not conflict with any of the currently active flow rules, adding the candidate flow rule to the set of currently active flow rules.

The method may include comparing the candidate flow rule to each of the flow rules in the set of currently active flow rules before the candidate flow rule is communicated to the network switch. The candidate flow rule and each of the currently active flow rules may include an action that determines how communications to which the rule applies are disposed of by the network switch, and the method may include, for each of the currently active flow rules: comparing the action specified by the candidate flow rule to the action specified by the currently active flow rule, and if the action specified by the candidate flow rule is the same as the action specified by the currently active flow rule, determining that the candidate flow rule does not conflict with the currently active flow rule. The method may include determining whether the candidate flow rule includes a set action, where the set action modifies communications to which it applies. The method may include, in response to determining that the candidate flow rule includes a set action, expanding the candidate flow rule to include the modifications permitted by the set action. The currently active flow rules may each have a priority, and the method may include comparing the expanded candidate flow rule to the currently active flow rules in order of decreasing priority. The method may include determining that the candidate flow rule conflicts with the set of currently active flow rules if the expanded candidate flow rule conflicts with any of the currently active flow rules. Embodiments of the method may include any combination of any of the foregoing aspects of the method. According to at least one embodiment of this disclosure, a security mediation service to enforce a security policy at an interface to a network switch of a dynamically programmable computer network, where the security mediation service is embodied in a computing system coupled to the network, includes a flow rule state manager to manage data relating to a set of currently active flow rules, where the currently active flow rules currently control the flow of communications across the network; and a conflict analyzer to determine whether a candidate flow rule conflicts with any of the currently active flow rules, and add the candidate flow rule to the set of currently active flow rules if the candidate flow rule does not conflict with any of the currently active flow rules.

The candidate flow rule and each of the currently active flow rules may include an action that determines how a communication is to be disposed of by the network switch if the rule applies to the communication, and the conflict analyzer may compare the action specified by the candidate flow rule to the action specified by each of the currently active flow rules. The candidate flow rule and each of the currently active flow rules may include a plurality of match fields each including a value that determines whether the candidate flow rule applies to a communication, and the conflict analyzer may compare the match fields of the candidate flow rule to the corresponding match fields of each of the currently active flow rules. In some embodiments, if the candidate flow rule permits another value to be substituted for the value of a match field of the candidate flow rule, the conflict analyzer may expand the candidate flow rule to include the value and the other value that may be substituted for the value of the match field, and may compare the expanded candidate flow rule to each of the currently active flow rules. In some embodiments, for each of the currently active flow rules, the conflict analyzer may expand the currently active flow rule to include any values that may be substituted for the values of the match fields of the currently active flow rule, and may compare the expanded candidate flow rule to each of the expanded currently active flow rules. The security mediation service may update the set of currently active flow rules to include the expanded candidate flow rule if the expanded candidate flow rule does not conflict with any of the expanded currently active flow rules. The security mediation service may communicate the candidate flow rule to the network switch if the candidate flow rule does not conflict with any of the currently active flow rules. The security mediation service may include a source authenticator to authenticate a source of the candidate flow rule, where the source includes one of a network administrator and a software application; and a conflict analyzer to determine whether to implement the candidate flow rule at the network switch based on a role associated with the source of the candidate flow rule. Embodiments of the security mediation service may include any combination of any of the foregoing aspects of the security mediation service.

According to at least one embodiment of this disclosure, a network controller may be embodied in one or more machine accessible storage media and may be configured to interface with software applications and with the network switch, and the network controller may include any combination of any of the foregoing aspects of the security mediation service.

According to at least one embodiment of this disclosure, a network virtualization layer may be embodied in one or more machine accessible storage media and may be configured to interface with software applications and with the network switch, and the network virtualization layer may include any combination of any of the foregoing aspects of the security mediation service.

According to at least one embodiment of this disclosure, a method for enforcing a security policy at an interface to a network switch of a dynamically programmable computer network includes, with a computing system coupled to the network: receiving a candidate flow rule from the network, where the candidate flow rule may be implemented by the network switch to control the flow of communications across the network, and the candidate flow rule includes match criteria having values that determine whether the candidate flow rule applies to a communication; determining whether the candidate flow rule permits other values to be substituted for any of the values of the match criteria; and deriving an expanded candidate flow rule from the candidate flow rule, where the expanded candidate flow rule includes the values of the match criteria and the other values.

The match criteria may include a plurality of match fields, and the expanding may include, for each of the match fields, deriving an alias set comprising the value of the match field and the other values that may be substituted for the value of the match field. The method may include determining whether the expanded candidate flow rule conflicts with a set of currently active flow rules, where the set of currently active flow rules currently controls the flow of communications across the network; and in response to determining that the expanded candidate flow rule does not conflict with any of the currently active flow rules, adding the expanded candidate flow rule to the set of currently active flow rules. The currently active flow rules may each be associated with a role, and the method may include comparing the candidate flow rule to the set of currently active flow rules in a priority order based on the roles assigned to the currently active flow rules. The method may include, for each of the match fields, determining whether the alias set intersects with a corresponding match field of each of the currently active flow rules. In the method, where each of the currently active flow rules includes match criteria having values that determine whether the currently active flow rule applies to a communication, the method may include expanding each of the currently active flow rules to include the values of the match criteria and any values that may be substituted for the values of the match criteria. The method may include comparing the expanded candidate flow rule to each of the expanded currently active flow rules. The match criteria of each of the currently active flow rules may include a plurality of match fields, and the expanding may include, for each of the match fields of each of the currently active flow rules, deriving an alias set comprising the value of the match field of the currently active flow rule and the other values that may be substituted for the value of the match field of the currently active flow rule. The match fields of the candidate flow rules and the match fields of each of the currently active flow rules may include a source field and a destination field, and the method may include determining whether the alias set of the source field of the candidate flow rule intersects with the alias set of the source field of any of the currently active flow rules and determining whether the alias set of the destination field of the candidate flow rule intersects with the alias set of the destination field of any of the currently active flow rules. The method may include updating the alias sets of each of the currently active flow rules if the expanded candidate flow rule is added to the set of currently active flow rules. Embodiments of the method may include any combination of any of the foregoing aspects of the method.

According to at least one embodiment of this disclosure, a method for enforcing a security policy for a dynamically programmable network includes, on the network: maintaining a set of currently active packet disposition directives, where the set of currently active packet disposition directives changes over time, and the currently active packet disposition directives are implemented at network switches to control one or more of the behavior and the configuration of the network switches at a current point in time; receiving, from a source of packet disposition directives, a candidate packet disposition directive that is not part of the set of currently active packet disposition directives; determining whether the candidate packet disposition directive violates the security policy; and in response to determining that the candidate packet disposition directive does not violate the current security policy, implementing the packet disposition directive at the network switches.

The method may include determining a role associated with the source of the candidate packet disposition directive to determine whether the candidate packet disposition directive violates the security policy, where the role may include one of a network administrator and a software application. The method may include determining a capability associated with the source of the candidate packet disposition directive to determine whether the candidate packet disposition directive violates the security policy, where the capability may indicate whether the source can change the behavior and/or configuration of the network switches. The method may include determining whether the candidate packet disposition directive conflicts with any of the currently active packet disposition directives to determine whether the candidate disposition directive violates the security policy. Embodiments of the method may include any combination of any of the foregoing aspects of the method.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
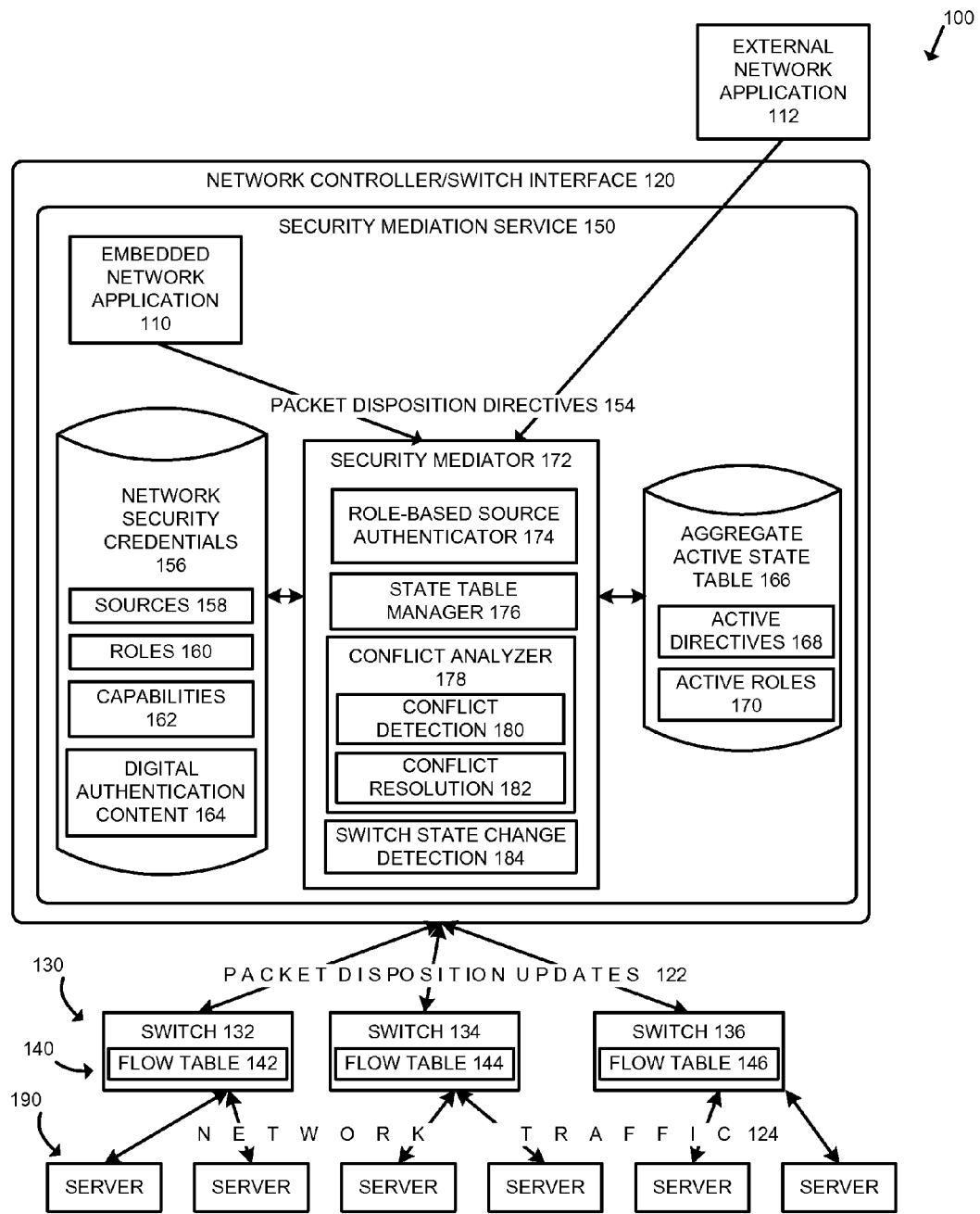
FIG. 1 is a simplified block diagram of at least one embodiment of a dynamically programmable network including a security mediation service.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Dynamically programmable networks, some embodiments of which may be referred to as software-defined networks or SDNs, present several new and unique challenges to the effective enforcement of traditional security policies. For instance, many different network flow control applications may be active on a particular SDN. These network applications may attempt to change the network flow control policies dynamically. Further, some network applications may incorporate security vulnerabilities, or may possibly be written by adversaries who wish to use the network application to take control of the network. In some cases, the flow control policies of the various active network applications may potentially conflict, in that some of the flow policies may be contradictory or may attempt to evade or override other flow policies.

For instance, in an evasion scenario referred to herein as dynamic flow tunneling, a network application may seek to evade an existing flow rule by adding a series of flow rules that redirect packets "around" the existing flow rule by modifying the packet header information (using, e.g., a "goto table" directive or "set" action). As an example, in a hypothetical SDN, suppose there are three host computers, one network switch, and one network controller (where a "network controller" in SDN terminology refers to software that acts as an interface between other running software applications, which produce network flows, and the switches or other packet-forwarding devices on the network). Suppose further that a firewall implemented as a network application on the hypothetical SDN has implemented a flow rule that requires the blocking of network packets that specify a particular source Internet Protocol (IP) address and a particular destination IP address. For instance, the firewall's flow rule may require packets from an outside host identified by an address, 10.0.0.2, that are directed to a web service identified as port 80, running on a host identified by an address, 10.0.0.4, to be blocked. Another network application may then attempt to add three new flow rules to be implemented by the network controller as follows. The first proposed rule modifies the source IP address of a packet to 10.0.0.1 if a packet is delivered from 10.0.0.2 to 10.0.0.3 (port 80). The second proposed rule changes the destination IP address of a packet to 10.0.0.4 if a packet is delivered from 10.0.0.1 to 10.0.0.3 (port 80). The third proposed rule simply allows the forwarding of a packet from 10.0.0.1 to 10.0.0.4 at port 80. None of these flow rules, taken individually, conflicts with the firewall's flow rule and thus would be implemented by the network controller, in the absence of security features such as those described herein.

If these proposed flow rules were to be implemented, the firewall's flow rule that blocks packets from 10.0.0.2 to 10.0.0.4 could be evaded. To illustrate this, suppose the host 10.0.0.2 sends a data packet to port 80 of the host 10.0.0.3. This packet can bypass the firewall because it does not directly go to the host 10.0.0.4, but to 10.0.0.3. However, this packet will eventually be delivered to the host 10.0.0.4 by the network controller even if there is a firewall forbidding such traffic, as a result of the second and third proposed flow rules above. In this way, an inadvertently erroneous or malicious network application can evade an existing firewall by simply adding a few flow rules.

These and other challenges can be addressed by implementing a non-bypassable security mediation service on the dynamically programmable network. As disclosed herein, embodiments of the security mediation service can monitor and evaluate flow rule insertion requests and other packet disposition directives (e.g., "packet-outs," "port mods," etc.) against a dynamically-changing security policy, and can do so in "real time," e.g., in response to the directives being produced by the network administrator and/or various software applications running on the network and before the directives are implemented by the network devices (e.g., switches). Embodiments of the security mediation service may enforce and preserve the integrity of the dynamically programmable network's security policy by providing role-based source authentication, conflict detection, conflict resolution, or any combination thereof. Some embodiments of the disclosed security mediation service are also described, for example, in Phillip A. Porras et al., *A Security Enforcement Kernel for OpenFlow Networks*, HotSDN'12, at 121-126 (Aug. 13, 2012); and Phillip A. Porras, *Empowering Dynamic Network Defenses Across OpenFlow Networks*, delivered at the SDN Security Seminars 2012 on Feb. 28, 2012, in San Francisco, Calif., both of which are incorporated herein by this reference. Other materials describing embodiments of the disclosed security mediation service, including video materials by Phillip A. Porras entitled *Inside FortKnox, Security Constraints Enforcement, Reflector Nets, and Automated Quarantine*, are posted at http://www.openflowsec.org/ and incorporated herein by this reference. Additionally, Mr. Porras discussed embodiments of the disclosed security mediation service in an interview posted on Jul. 3, 2012 at http://www.sdncentral.com/sdn-blog/phil-porras-openflow-secure-controller/2012/07/(*Interview with Phil Porras: Lack of Secure Controller Hurting OpenFlow?*) and in an interview posted on Feb. 26, 2013 at http://www.sdncentral.com/sdn-blog/sdn-security-oxymoron-phil-porras-sri/2013/02/(*SDN Security—An Oxymoron? New Interview with Phil Porras of SRI International*), both of which are incorporated herein by this reference.

Referring now to FIG. 1, an embodiment of a security mediation service 150 for a dynamically programmable network 100 is embodied in a network controller/switch interface 120. The illustrative dynamically programmable network 100 is embodied as a packet-switching digital communications network that is implemented using a software-defined networking approach (such as the OpenFlow protocol). In some embodiments, the network 100 may correspond to a physical or logical (e.g., virtualized) subset of a larger network, such as a "network slice."

The illustrative network controller/switch interface 120 controls the network communications between software applications 110, 112 and one or more network switches 132, 134, 136 on the network 100. As such, the illustrative security mediation service 150 typically executes in a separate process space from at least the external network applications 112 and is also usually separated from any processes that may be running at the switches 132, 134, 136. For example, in the illustrated embodiments, the security mediation service 150 is not implemented as part of a firewall.

The network controller/switch interface 120 may be embodied as a software abstraction of the network control layer of the network switches 132, 134, 136. For instance, the network controller/switch interface 120 may be implemented as part of or as an extension to an SDN controller, such as an OpenFlow controller. Some vendors of SDN controllers include Big Switch Networks, HP, IBM, VMWare, and Juniper. In other embodiments, the controller/interface 120 may be embodied in a shim layer between a network controller and the network applications 110, 112, or as part of another type of network virtualization layer. One example of a network virtualization layer for an SDN (and OpenFlow, specifically) is FlowVisor, developed by Stanford University, Deutsch Telecom, Inc., and Nicira Networks. In any case, the network controller/switch interface 120 may execute on one or more computing devices (e.g., servers), separately from the network switches 132, 134, 136 and/or separately from other computing devices on which the applications 110, 112 may be running.

The network controller/switch interface 120 may be connected to each of the switches 132, 134, 136 using, e.g., a dedicated control connection. The network switches 132, 134, 136 each may be embodied as, for example, a switch, a router, a load balancer, a learning switch, or another type of network device. The switches 132, 134, 136 each communicate with one or more servers 190 to effectuate the flow of network traffic 124 across the network 100 in accordance with a network security policy. As used herein, terms such as "network traffic" and "network flow" refer to, in the context of the network 100, sequences of data packets from a source computer to a destination, where the destination may be, for example, another host, a multicast group, or a broadcast domain. In some cases, network flow may refer to a logical equivalent of a call or a connection. A network flow may include all of the data packets in a specific transport connection or media stream. However, a network flow need not be directly mapped to a transport connection. A network flow can also be thought of as a set of data packets that pass an observation point in the network during a certain time interval.

The security policy for the dynamically programmable network 100 may be established by, for example, a network administrator. As used herein, the term "network administrator" may refer to, for example, a human operator, a network security software application, and/or a computerized agent or delegate of a human operator, such as a software application that acts under the direction of or in response to inputs from the human operator. The security policy may be implemented at the switches 132, 134, 136 as a number of network flow rules, which are maintained at the switches 132, 134, 136 in local flow tables 142, 144, 146. The local flow tables 142, 144, 146 are used by their respective switches 132, 134, 136 to instantiate flow rules at the switch and direct the network traffic 124 between the servers 190. Each of the switches 132, 134, 136 updates its respective local flow table 142, 144, 146 in accordance with the packet disposition updates 122. In some embodiments, the switches 132, 134, 136 may communicate changes in the local flow tables 140 back to the security mediation service 150. For simplicity, the illustrative network 100 is shown with three network switches 132, 134, 136 having local flow tables 142, 144, 146, respectively; however, the network 100 may include any number of switches 132, 134, 136.

Each of the servers 190 may be embodied as any suitable type of computing resource, e.g., a server computer, group of server computers, or one or more other devices that are configured to communicate with the switches 132, 134, 136 to send and receive data packets over the network 100. For simplicity, the illustrative network 100 is shown with a fixed number of servers 190 per switch 130; however, the network 100 may include any number of servers 190 in communication with any number of switches 130.

The security mediation service 150 includes a security mediator 172, which receives packet disposition directives 154 from the network applications 110, 112 in a non-bypassable manner. That is, the illustrative security mediator 172 is implemented between the applications 110, 112 and the network switches 132, 134, 136, so that all packet disposition directives 154 pass through or are intercepted by the security mediator 172 before being implemented by the switches 132, 134, 136. The security mediator 172 evaluates the packet disposition directives 154 based on the then-current network security policy, as described in more detail below. After a packet disposition directive 154 has been evaluated by the security mediator 172, the security mediation service 150 may communicate a corresponding packet disposition update 122 to one or more of the network switches 132, 134, 136.

As used herein, a "packet disposition directive" refers generally to any computer logic that determines or results in the disposition of one or more data packets by the switches 132, 134, 136 on the dynamically programmable network 100, or that changes the switches' behavior or configuration in any way. Some examples of potential packet dispositions include "forward" (in which a data packet is sent on to its next, intermediate or final, destination), "drop" (in which a switch deliberately does not send a data packet on to its next destination, because, for example, the switch's capacity is overloaded or the switch believes that the packet is part of a denial-of-service attack), and "modify" (in which information in the packet header is modified by the directive). Thus, packet disposition directives 154 can include flow rule insertion requests as well as other types of communications that result in a packet disposition without specifying a flow rule, such as "packet-outs" and "port mods." A packet-out refers, generally, to a packet disposition directive 154 that may request one or more of the switches 132, 134, 136 to generate network traffic 124 in response to a specified network condition. A port mod refers, generally, to a packet disposition directive 154 that can enable or disable a port of a network switch 130. Packet disposition directives 154 can be produced by, for example, the network administrator and/or by any one or more of the network applications 110, 112. The packet disposition directives 154 may conform to or extend a software-defined network protocol implemented by the network controller/switch interface 120. For example, in some embodiments, the packet disposition directives 154 may be OpenFlow messages. In some embodiments, the packet disposition directives 154 may directly correspond to flow rules that can be directly instantiated at the network switches 132, 134, 136.

As used herein, a "flow rule" refers to packet disposition directives 154 that contain logic that, if executed at the network switches 132, 134, 136, would control the flow of data packets across the network 100. Thus, the set of all flow rules instantiated on the dynamically programmable network 100 embodies a current implementation of the network security policy. However, in the dynamically programmable network 100, flow rules, and thus, the network security policy, can be modified "on the fly" by the packet disposition directives 154. Thus, as used herein, "dynamically" connotes a network in which the flow rules, and thus the security policy, may be constantly varying or changing in response to, for example, the then-current network conditions. As used herein, terms such as "currently active flow rules" or "currently active directives" refer generally to the set of flow rules and/or other packet disposition directives that, at a particular moment in time during the operation of the network 100, represents the then-current network security policy. As used herein, terms such as "candidate flow rule" or "candidate directive" refer generally to any flow rule or other packet disposition directive that is not currently part of the set of currently active directives. In other words, "candidate flow rules" refer to flow rules that have not yet been evaluated by the security mediator 172, are currently being evaluated by the security mediator 172, or that have been evaluated but rejected by the security mediator 172.

To simplify the discussion, flow rules are referred to herein as having two main parts: match criteria and actions. The match criteria determine whether a flow rule applies to a particular data packet. The match criteria include a number of match fields, including those that specify source and destination criteria for matching data packets to the flow rule. The source and destination match fields each identify particular computing resources by any suitable references or identifiers, such as IP addresses, network masks, ports, and the like. In some embodiments, match fields other than source and destination may be used to evaluate the applicability of a flow rule to a data packet, and in some embodiments, one match criterion or multiple match criteria may be used.

A flow rule may contain one or more actions. The action(s) contained in the flow rule specify what action(s) are to be taken by a network switch if the flow rule applies to a particular data packet; that is, if the values of the match fields of the flow rule match the values of the corresponding match fields in the header of the data packet. An action may specify a disposition for the data packet, for example, to drop, forward, or modify the data packet. Some flow rules may specify that the data packet's header information is to be modified or rewritten, e.g., using a "set" action (in OpenFlow terminology), if the flow rule applies to the packet.

The network applications 110, 112 may each be embodied as any software program that controls, defines, or otherwise interacts with the dynamically programmable network 100. For instance, the network applications 110, 112 may include network security applications and/or other types of software applications running on the network 100. Each of the network applications 110, 112 may produce one or more packet disposition directives 154 that are received or intercepted by the security mediator 172 on their way to the network switches 132, 134, 136.

The illustrative embedded network application 110 is embodied as a network software application that executes in the same process space as the security mediation service 150. For example, the embedded network application 110 may be embodied as a loadable module executing within the same operating system process as the security mediation service 150. As another example, the embedded network application 110 may be embodied as a bytecode module loaded from the same archive as the security mediation service 150.

The illustrative external network application 112 is embodied as a network software application that executes outside of the process space of the security mediation service 150. For example, the external network application 112 may be embodied as a separate operating system process executing on the same computing device as the security mediation service 150 or on a remote computing device. In some embodiments, the external network application 112 may be embodied as a legacy native C OpenFlow application that communicates with the security mediation service 150 through an inter-process communication (IPC) proxy and IPC interface, where the IPC interface may be embedded in the same process space as the security mediation service 150 but the IPC proxy allows the network application 112 to be embodied as a separate operating system process that communicates with the security medication service 150 using the IPC proxy. As a separate operating system process, the external network application 112 may execute from a separate, non-privileged account. In other embodiments, the external network application 112 may be embodied as a Python OpenFlow application that communicates with the security mediation service 150 through a Python Simplified Wrapper and Interface Generator (SWIG). For simplicity, only two illustrative network applications are shown in FIG. 1. However, the network 100 may include any number of external and/or embedded network applications 110, 112, or other types of software applications.

In some embodiments, one or more of the network applications 110, 112 may be embodied as or include a security directive translator. The security directive translator may convert commands received from other network applications 110, 112 into packet disposition directives 154 that are suitable for submission to the security mediation service 150. For example, the security directive translator may receive high-level threat-mitigation directives that are translated into lower-level packet disposition directives 154. In some embodiments, the security directive translator may resolve the higher-level directives using a pre-defined set of security directives, which may include, for example, "block," "deny," "allow," "redirect," "quarantine," "undo," "constrain," and/or "info" directives. A "block" directive may, for example, implement a full duplex filter between a Classless Inter-Domain Routing (CIDR) block and the internal network, where the primary use for this command is in blacklist enforcement. The deny, allow, undo, and info directives may be similar to their firewall counterparts and capable of being refined down to an individual flow rule. A "redirect" directive may, for example, enable a network application 110, 112 to tunnel all flows between a source and given target to a new target. With a redirect, a switch 132, 134, 136 may rewrite the packet headers of all applicable network flows such that a source cannot tell that its flows have been redirected to the new target. One application of the "redirect" directive includes the redirection of a malicious scanner into a honeynet. A "quarantine" directive may enable a network application 110, 112 to essentially isolate an internal host from the network. A "constrain" directive may enable a network application 110, 112 to deactivate all current flow rules in the switches 132, 134, 136 that are not set to a specified priority (e.g., flow rules that are non-privileged).

Referring now in more detail to the security mediation service 150 of FIG. 1, the security mediation service 150 validates the sources of the packet disposition directives 154, analyzes the packet disposition directives 154 for conflicts with existing flow rules, and performs role-based conflict resolution. The security mediation service 150 detects and resolves conflicts quickly, allowing for real-time or near-real time control of the network flow rules. The illustrative security mediation service 150 is embodied as a number of computerized modules and data structures including a network security credentials table 156, an aggregate active state table 166, and a security mediator 172. Such computerized modules and data structures may execute or be resident on the same computing device or group of computing devices as the network controller/switch interface 120, and/or on one or more other computing devices that are connected to the network 100.

To receive packet disposition directives 154 from the various network applications 110, 112, the security mediation service 150 may include one or more network communication interfaces. For example, packet disposition directives 154 may be received from an embedded network application 110 using a computer scripting interface. Packet disposition directives 154 may be received from external network applications 112 using an inter-process communication mechanism such as pipes, sockets, or the like. For example, packet disposition directives 154 may be received through a secure sockets layer (SSL) communication from the external network application 112, which may be implemented as a process on a computing device separate from the security mediation service 150.

The security mediator 172 interfaces with the network security credentials table 156 to validate the sources or "producers" of packet disposition directives 154, and interfaces with the aggregate active state table 166 to maintain the current status of the network security policy as implemented as the set of currently active packet disposition directives. The network security credentials table 156 maintains a trust model for the security mediation service 150, which associates the various sources of packet disposition directives 154 with one or more security roles, packet disposition capabilities, and digital authentication content. As such, the network security credentials table 156 includes data relating to the sources 158, security roles 160, capabilities 162, and digital authentication content 164. The sources 158 may identify particular users, e.g., network administrators, or particular network applications 110, 112, which may submit packet disposition directives 154. The sources 158 may also be referred to by terminology such as "flow rule producers" or "rule insertion requestors." The security roles 160 define particular security roles that may be assigned to the sources 158. Each role 160 has an associated priority, which is used by the security mediation service 150 to resolve flow rule conflicts. In some embodiments, one or more of the roles 160 may be extended with sub-roles according to the requirements of a particular design of the security mediation service 150. In some embodiments, the security roles 160 may include a number of pre-defined roles, e.g.: network administrators, security-related network applications 110, 112, and non-security-related applications 110, 112. For example, in some embodiments, the security role 160 associated with network administrators may be assigned the highest priority. The security role 160 associated with security-related network applications 110 may be assigned an intermediate priority that is lower than the administrator's priority but higher than the priority of other applications. For instance, network security applications may produce flow rules that further constrain the network administrator's static network security policy, based on newly perceived runtime threats or other current network conditions. The lowest-priority security role 160 may be assigned to sources 158 that are non-security-related network applications 110, 112, or that are unidentified (e.g., not digitally authenticated), or that are without an assigned role 160. Each of the roles 160 may be associated with one or more of the capabilities 162. The capabilities 162 define the operations that sources 158 are permitted to perform on the network 100; for example, the capabilities may include the ability to create, modify, or delete flow rules, the ability to create packet-outs, the ability to perform port mods, and the like. The capabilities 162 may be associated with particular roles 160, in some embodiments. As an example, in accordance with the network security credentials 156, a source 158 may be associated with a role 160, and based on the role 160 and/or the digital authentication content 164 associated with the source 158, the source 158 may have certain limited or expanded capabilities 162. The source 158's role 160 and/or capabilities 162 may be determined based at least in part on whether the source 158 has associated digital authentication content 164. For example, in some embodiments, whether a source 158 has capabilities 162 that include the ability to create packet-outs or perform port mods may depend upon whether the source 158's identity has been successfully authenticated. When a packet disposition directive 154 is evaluated by the security mediation service 150, the security mediation service 150 considers the role 160 and/or capabilities 162 associated with the source 158 of the packet disposition directive 154.

The digital authentication content 164 stores information needed to identify and authenticate the sources 158. For example, the digital authentication content 164 may store a public key from a digital certificate associated with each source 158. For network applications 110, 112, the digital authentication content 164 may include an authentication tuple appropriate for the particular network application. For example, a external network application 112 may be identified by an SSL credential, an identity credential, and an SSL connection. In another example, an embedded network application 110 may be identified by a digital certificate and a digitally signed bytecode module.

The aggregate active state table 166 tracks the current state of the security policy on the network 100, as embodied in the set of currently active packet disposition directives 168, as it changes over time during the operation of the network. The aggregate active state table 166 thus stores data relating to the active directives 168, which represent all of the currently accepted packet disposition directives 154 in the dynamically programmable network 100 at any given moment in time. The aggregate active state table 166 also stores data relating to the currently active roles 170, which reference the security roles 160 associated with each of the currently active directives 168. Additionally, the aggregate active state table 166 maintains data relating to the current state of each of the local flow tables 140 of the switches 132, 134, 136 as it changes over time during the operation of the network 100.

The data relating to the active directives 168 may include, for each of the currently active directives 168 that includes a flow rule, a representation of the flow rule that is referred to herein as an alias set reduced format, or "alias set reduced rules." The alias set reduced rules each include an expansion of the flow rule that makes explicit any field substitutions that would result from the application of the flow rule to a data packet to which the rule applies. In a simplified example, each alias set reduced rule includes a representation of the active flow rule itself, a source alias set, a destination alias set, an associated security role 160, and a disposition (e.g., drop, forward, modify, etc.). The source and destination alias sets are expanded representations of the source and destination match fields of the flow rule, respectively, which incorporate, for example, "set" action transformations and wildcards.

The alias sets initially include the values of the source and destination criteria (e.g., IP addresses, network masks, ports, etc.) specified in the match fields of the flow rule. If the rule's action allows another value to be substituted for the initial value of a match field, using, e.g., a "set" action, the resulting value or values are added to the associated alias set. Alias set expansion may continue for related, subsequent flow rules. The initial alias sets for each subsequent flow rule are created for the source and destination match fields as above. These alias sets are then compared to the alias sets of the previous rule. If an alias set intersects with the alias set of the previous rule, the union of the alias sets is used as the alias set for the subsequent rule. As used herein, "intersect" connotes, as in mathematics, the generation of a set that contains all elements of a set A that also belong to another set B (or equivalently, all elements of B that also belong to A), but no other elements. As used herein, "union" connotes, as in mathematics, the generation of a set that contains all elements of a set A and all elements of another set B, but no duplicates. Such expansion is performed for all of the currently active flow rules and stored in the aggregate active state table 166.

For example, Table 1 below illustrates a set of three related flow rules and their associated alias sets. Flow rule 1 matches packets with source a and destination c, and includes an action to set a to a'. Thus, for rule 1, the source alias set is (a, a') and the destination alias set is (c). Rule 2 matches packets with source a' to destination c and includes an action to set c to b. The source alias set for rule 2 is initially (a'), which intersects with the source alias set for rule 1. Thus, the source alias set for rule 2 is (a, a'), the union of the source alias sets of rules 1 and 2. Based on the set action, the destination alias set for rule 2 is (c, b). Lastly, rule 3 matches packets with source a' to destination b and includes an action to forward the data packet. The initial source and destination alias sets are (a') and (b), respectively. These alias sets intersect with the alias sets of rule 2, so the final alias sets of rule 3 are (a, a') and (c, b).

TABLE 1

Flow rules and alias sets.

| # | Rule | Source Alias Set | Destination Alias Set |
|---|------|------------------|----------------------|
| 1 | a → c (set a ⇒ a') | (a, a') | (c) |
| 2 | a' → c (set c ⇒ b) | (a, a') | (c, b) |
| 3 | a' → b forward packet | (a, a') | (c, b) |

Referring now in more detail to the security mediator 172 of FIG. 1, the security mediator 172 receives the packet disposition directives 154 from the network applications 110, 112 and analyzes each of the packet disposition directives 154 to detect and resolve conflicts with the then-current security policy as expressed by the active directives 168. Acceptable packet disposition directives 154 are added to the active directives 168 and implemented on the switches 132, 134, 136. The illustrative security mediator 172 is embodied as a number of computerized modules and data structures including a role-based source authenticator 174, a state table manager 176, a conflict analyzer 178, and a switch state change detection module 184.

The role-based source authenticator 174 identifies and authenticates the source 158 associated with the packet disposition directive 154 and associates the source 158's role 160 with the packet disposition directive 154, as described in detail below in connection with FIG. 2. To perform such authentication and validation, the role-based source authenticator 174 may reference the network security credentials table 156.

The state table manager 176 manages and maintains the current state of the aggregate active state table 166 and/or the network security credentials table 156 as flow rules and/or other directives are added, modified, and deleted from the set of currently active directives. The state table manager 176 may operate in conjunction with the switch state change detection module 184, so that the aggregate active state table 168 remains synchronized with the local flow tables 142, 144, 146 at the network switches 132, 134, 136, as described in more detail below.

The conflict analyzer 178 determines, "live"—that is, when a packet disposition directive 154 is received at the security mediator 172—whether to instantiate a packet disposition directive 154 based on its associated role 160. For packet disposition directives 154 containing flow rule insertion requests (e.g., candidate flow rules), the conflict analyzer 178 may compare each candidate flow rule to the set of existing active directives 168. Such comparison may detect one or more rule conflicts, including rule conflicts involving dynamic flow tunneling. As used herein, a "rule conflict" arises when a candidate flow rule seeks to enable a network flow that is otherwise prohibited by the existing currently active directives 168, or a candidate flow rule seeks to disable a network flow that is otherwise allowed by the existing currently active directives 168. For example, conflicts can include contradictory or inconsistent rules. Any conflicts between candidate flow rules and existing active directives 168 are resolved in accordance with the network security policy. In some embodiments, conflict detection and conflict resolution may be performed by sub-modules of the conflict analyzer 178, for example by a conflict detection module 180 and/or a conflict resolution module 182.

The switch state change detection module 184 communicates messages received from the switches 132, 134, 136 relating to the status of the local flow tables 140 of each switch 130. In particular, the switch state change detection module 184 may provide an interface by which the aggregate active state table 166 is updated when any the switches 132, 134, 136 perform rule expiration. In some embodiments, the switch state change detection module 184 may implement a callback routine to receive messages from the switches 132, 134, 136 and coordinate the state of the switches 132, 134, 136 with the aggregate active state table 166. For example, a switch 130 may reject or refuse flow rule updates when resources of the switch 132, 134, 136, such as the local flow tables 142, 144, 146 are exhausted. In such event, the switch 130 may send a message to the switch state change detection module 184 signaling such rejection. In other embodiments, a switch 130 may delete a flow rule based on the expiration of a defined amount of time (e.g., a "timeout") and send a message signaling the deletion to the switch state change detection module 184. The switch state change detection module 184 receives such messages and updates the aggregate active state table 166 accordingly.

Figure 2:
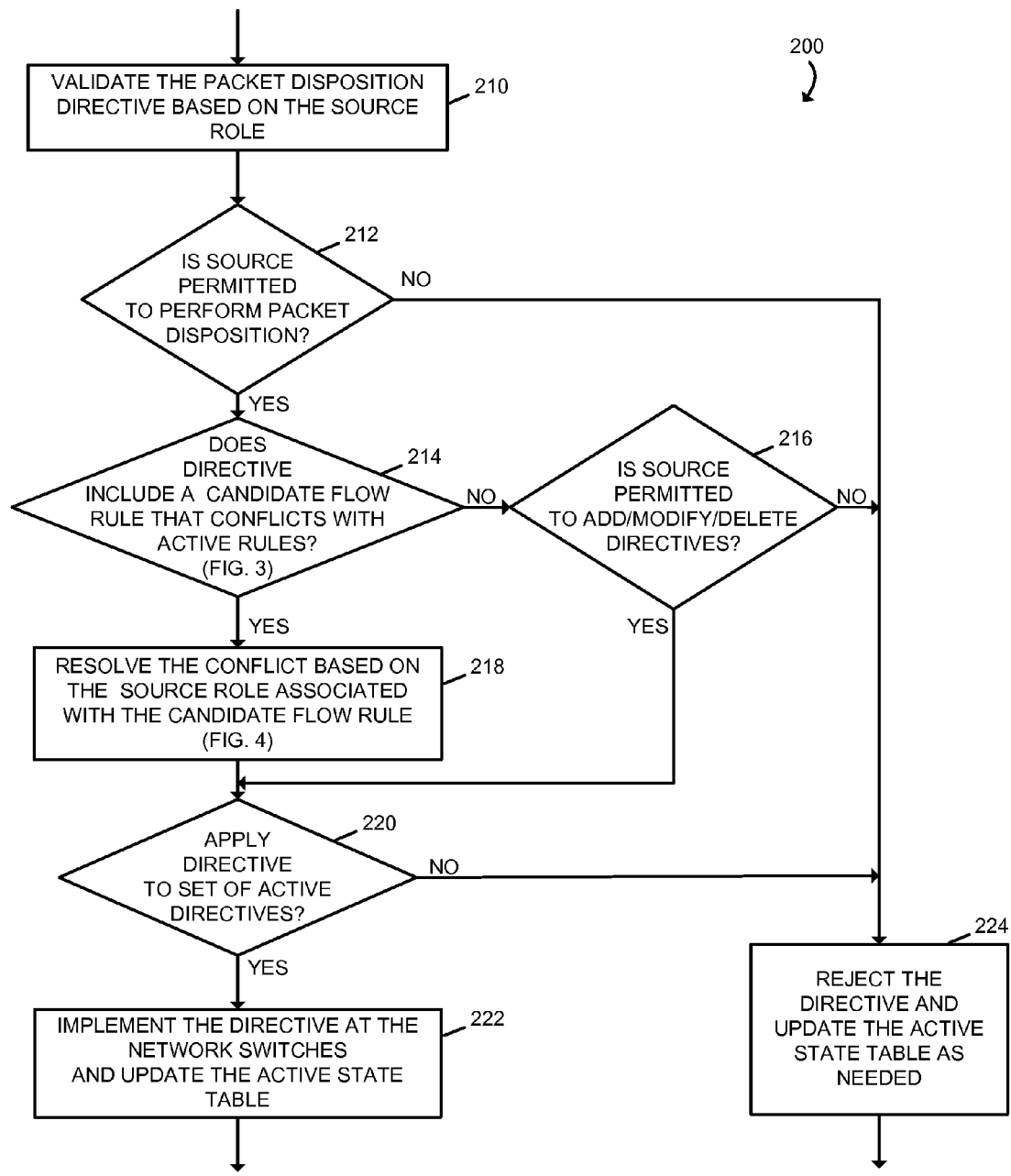
FIG. 2 is a simplified flow diagram of at least one embodiment of a method by which the security mediation service of FIG. 1 may dynamically monitor packet disposition directives for compliance with a security policy.

Referring now to FIG. 2, an illustrative method 200 for managing packet disposition directives 154 "inline," e.g., as the directives 154 are received by the security mediator 172 during the operation of the network 100, is shown. The method 200 may be embodied as computerized programs, routines, logic and/or instructions of the computing system 710, e.g., as part of the security mediation service 150, for example. At block 210, the method 200 validates the packet disposition directive 154 based on its associated security role 160. In some embodiments, the role-based source authenticator 174 may determine the role 160 by first determining the source 158 of the packet disposition directive 154, for example by validating a digital certificate used by the source 158 to sign the packet disposition directive 154. In other embodiments, the packet disposition directive 154 may be validated by the act of successful receipt, for example when transmitted over a secure sockets layer connection that is secured by a digital certificate. As described above, the source 158's association with a role 160 may be maintained by the network security credentials table 156. If the source 158 is not associated with any role 160, the role-based source authenticator 174 may assign the lowest-priority role 160 to the packet disposition directive 154.

In block 212, the method 200 determines whether the source 158 is permitted to perform the requested packet disposition directive 154. The role-based source authenticator 174 may reference the capabilities 162 and/or the role 160 of the requested packet disposition directive 154 to determine whether the requested disposition is permitted. For example, sources 158 with lower-priority roles 160 or fewer capabilities 162 may not be permitted to perform packet-outs or port mods. If the source 158 is not permitted to perform the requested directive 154, the method 200 branches to block 224 to reject the packet disposition directive 154, as described below. If the source 158 is permitted to perform the requested directive 154, the method 200 advances to block 214.

In block 214, the method 200 determines whether a candidate flow rule included in the packet disposition directive 154 conflicts with the set of active directives 168. As described above, the packet disposition directive 154 may include a flow rule insertion request describing a "candidate flow rule" to be installed at the network switches 132, 134, 136. In some embodiments, the determination of whether a rule conflict exists may be performed by executing an illustrative method 300 shown in FIG. 3. If the method 200 determines at block 214 that the packet disposition directive 154 includes a candidate flow rule that conflicts with the active directives 168, then the method 200 proceeds to block 218 as described below. If the packet disposition directive 154 includes a candidate flow rule that does not conflict with the active directives 168 (or the directive 154 does not include a candidate flow rule), the method 200 branches to block 216.

In block 216, the method 200 determines whether the source of the packet disposition directive 154 is permitted to add, modify or delete the active packet disposition directives 168. The method 200 may perform such determination by referencing the network security credentials table 156. The security policy for the dynamically programmable network 100 may require that a particular capability 162 be associated with the source 158 in order to add, modify, or delete active directives 168. For example, network administrators or security-related network applications 110, 112 may be allowed to add, modify, or delete flow rules, but non-security-related or unidentified network applications 110, 112 may only be allowed to add flow rules that do not conflict with the flow rules produced by the network administrators. Checking the security role associated with the directive 154 at this point allows for security enforcement even when no flow rule conflict exists. For instance, a directive 154 that includes a packet-out can be evaluated in this way. If the source of the directive 154 is permitted to add, modify, or delete directives 168, the method 200 branches to block 220 as described below. If the source of the directive 154 is not permitted to add, modify, or delete directives 168, the method 200 proceeds to block 224.

In block 224, the method 200 rejects the packet disposition directive 154 and may update the aggregate active state table 166 as needed. The method 200 may delete any flow rules corresponding to the packet disposition directive 154 that may have been stored in the aggregate active state table 166. In some embodiments, the rejection of the directive 154 may be signaled to the appropriate network application 110, 112 through the network controller/switch interface 120.

Referring back to block 214, if the packet disposition directive 154 conflicts with the active directives 168, the method 200 proceeds to block 218, in which the method 200 resolves the rule conflict based on the security role 160 of the packet disposition directive 154. The method 200 determines whether to accept or reject the packet disposition directive 154 by comparing the security role 160 of the packet disposition directive 154 and the particular conflicting rules of the active directives 168. The method 200 may determine whether to implement the packet disposition directive 154 at the network switches 132, 134, 136 based on whether the candidate flow rule for the packet disposition directive 154 has a higher priority than the conflicting active flow rules. In some embodiments, rule conflict resolution may be performed by executing an illustrative method 400 shown in FIG. 4.

After completion of block 218, the method 200 proceeds to block 220. Additionally, referring back to block 216, if the source 158 is permitted to add, modify or delete active directives 168, the method 200 also branches to block 220. In block 220, the method 200 determines whether to add the packet disposition directive 154 to the set of active directives 168. The method 200 may add the packet disposition directive 154 to the set of active directives 168 if there is no conflict and the source 158 is permitted to add, modify, or delete flow rules, or if there is a conflict that was resolved in favor of overriding an active flow rule with the candidate flow rule. The method 200 may not add the packet disposition directive 154 to the set of active directives 168 if there is a rule conflict and the conflict was resolved in favor of rejecting the candidate flow rule. If the method 200 determines not to add the packet disposition directive 154 to the set of active directives 168, the method 200 branches to block 224 to reject the packet disposition directive 154, as described above. If the method 200 determines to add the packet disposition directive 154 to the set of active directives, the method 200 proceeds to block 222.

In block 222, the method 200 instantiates the newly-approved packet disposition directive 154 at the network switches 132, 134, 136 and updates the aggregate active state table 166 accordingly. To instantiate the packet disposition directive 154, the security mediation service 150 may communicate packet disposition updates 122 to the switches 132, 134, 136. For example, the network controller/switch interface 120 may send appropriate OpenFlow commands to the switches 132, 134, 136 to implement a newly-approved candidate flow rule and to purge any inconsistent active flow rules from the local flow tables 142, 144, 146. In response to receiving the packet disposition updates 122, each of the switches 132, 134, 136 inserts appropriate flow control rules into the respective local flow table 142, 144, 146. The aggregate active state table 166 may be updated to include the packet disposition directive 154 as part of the active directives 168. Conflicting active flow rules may be purged from the aggregate active state table 166 and from the local flow tables 142, 144, 146. Additionally, the state of the switches 132, 134, 136 may be recorded in the aggregate active state table 166. As described above, the switch state change detection module 184 may register one or more callback functions in order to keep the aggregate active state table 166 synchronized with the current state of the switches 132, 134, 136.

The security mediation service 150 may coordinate the communication of the packet disposition updates 122 to the network switches 132, 134, 136 to maintain the consistency and correctness of the dynamically programmable network 100. In some embodiments, the security mediation service 150 may first communicate the packet disposition updates 122 to the most distant network switch. For example, consider that of the switches 132, 134, and 136, network switch 136 is most distant from the network controller/switch interface 120 in terms of geography, latency, network topography, or the like. The security mediation service 150 may send the packet disposition updates 122 to the network switch 136 before the network switches 132, 134. Alternatively or additionally, in some embodiments the security mediation service 150 may first communicate the packet disposition updates 122 to all network switches that did not trigger the packet disposition directive 154 before communicating the packet disposition updates 122 to the triggering network switch. Packet disposition updates 122 may be triggered by network switches in several circumstances. For example, the network switch 136 may request a flow rule after encountering a data packet that does not match any rules in the local flow table 146. As another example, a network application 110, 112, may trigger packet disposition updates 122 based on activity observed at the network switch 136. In such embodiments, the security mediation service 150 may communicate the packet disposition updates 122 to the network switches 132, 134 before communicating them to the network switch 136. Such ordering ensures that the state of the network 100 remains consistent and correct across all of the network devices.

Conflict Detection

Figure 3:
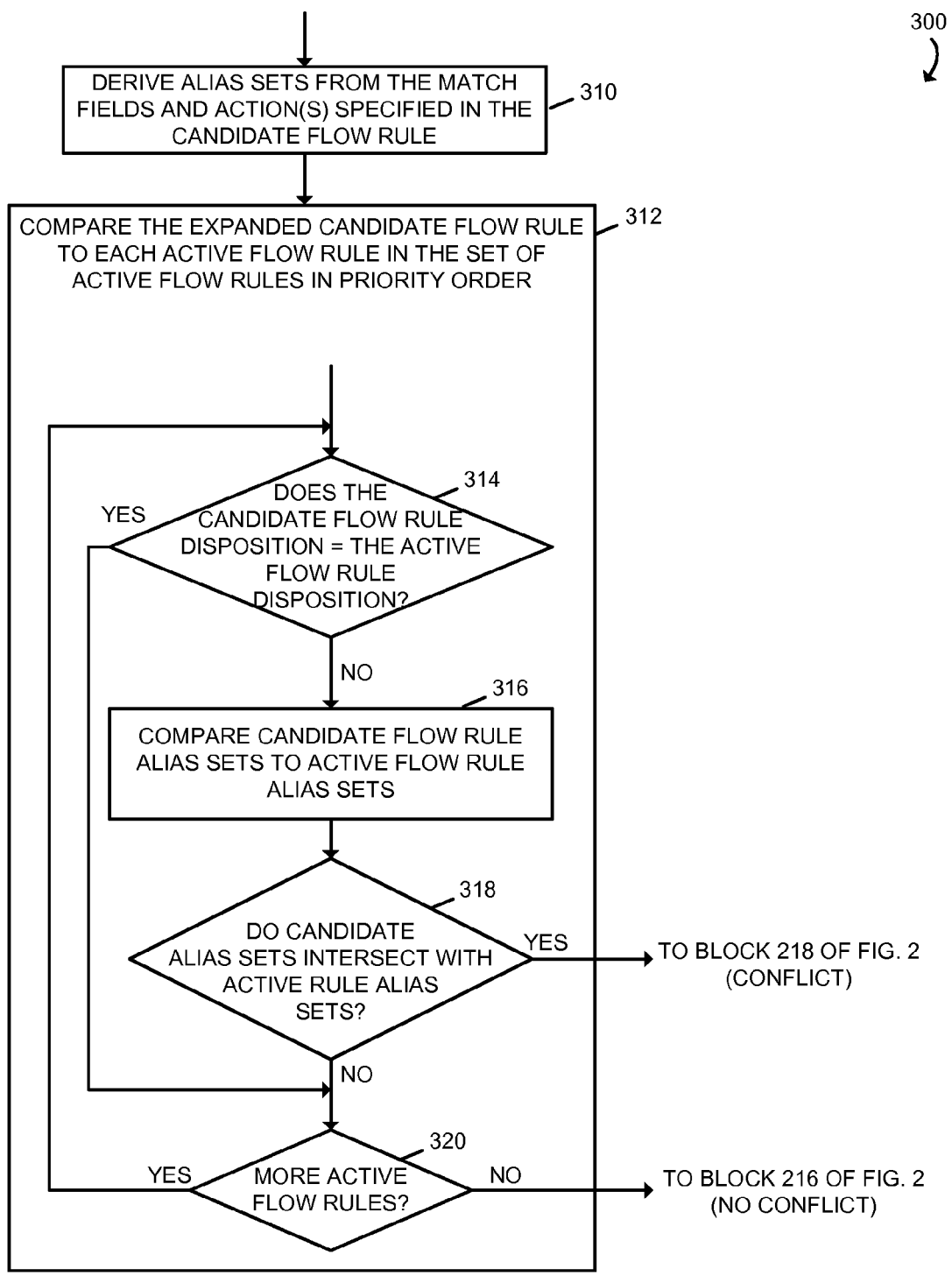
FIG. 3 is a simplified flow diagram of at least one embodiment of a method by which the security mediation service of FIG. 1 may detect flow rule conflicts.

Referring now to FIG. 3, the method 300 for determining whether a candidate flow rule conflicts with any of the active directives 168 is shown. The method 300 may be embodied as computerized programs, routines, logic and/or instructions of the computing system 710, e.g., as part of the conflict detection module 180, for example. In block 310, the method 300 derives the source alias set and destination alias set for the candidate flow rule. Derivation of alias sets is described above with respect to the aggregate active state table 166 of FIG. 1.

In block 312, the method 300 compares the alias sets for the candidate flow rule to the alias sets of each of the active flow rules in the set of active directives 168. Illustratively, the candidate flow rule is compared to the active directives 168 in decreasing priority order. The active directives 168 may be stored in sorted order, or may be sorted prior to such comparison. In block 314, the method 300 determines whether the disposition specified in the candidate flow rule equals the disposition of the active flow rule. For example, the dispositions are equal when both are forward or both are drop. If the dispositions are both forward or both drop, then the two flow rules do not conflict. Thus, if the dispositions are equal, the method 300 skips ahead to block 320, described below. If the dispositions are not both forward or both drop, the method 300 advances to block 316.

In block 316, the method 300 compares the candidate flow rule alias sets to the active flow rule alias sets. As described above, the alias sets for the active flow rule may be pre-computed, for example when stored as an alias set reduced rule in the aggregate active state table 166. In block 318, the method 300 determines whether the alias sets of the candidate flow rule intersect with the alias sets of the active flow rule. That is, the method 300 determines whether both the source alias sets of each flow rule intersect and the destination alias sets of each flow rule intersect. Because the match field for each flow rule may include wildcards and/or network masks, for example, in this context set intersection is evaluated by determining whether each field specification is more encompassing ("wider"), more specific ("narrower") or equal to another field specification. If the alias sets intersect, a conflict has been identified. In other words, a conflict exists when the alias set for an active flow rule interests with the alias set of the candidate flow rule and the action part of both the active flow rule and the candidate flow rule are not equal. Where the active directives 168 are evaluated in decreasing priority order, there may be no need to test further active flow rules once a conflict has been found, and the method 300 returns to block 218 of FIG. 2. In some embodiments, however, the method 300 may continue on to block 320 and continue to evaluate the one or more of the remaining active flow rules 168, before returning to block 218 of FIG. 2. If the alias sets of the candidate and active flow rules do not intersect, then no conflict has been found and the method 300 advances to block 320.

In block 320, the method 300 determines whether the active directives 168 include additional active flow rules to be evaluated. If there are additional active flow rules to be evaluated, the method 300 loops back to block 314 to compare the next active flow rule to the candidate flow rule. If no additional active flow rules are to be evaluated, the method 300 returns to block 216 of FIG. 2.

Conflict Resolution

Figure 4:
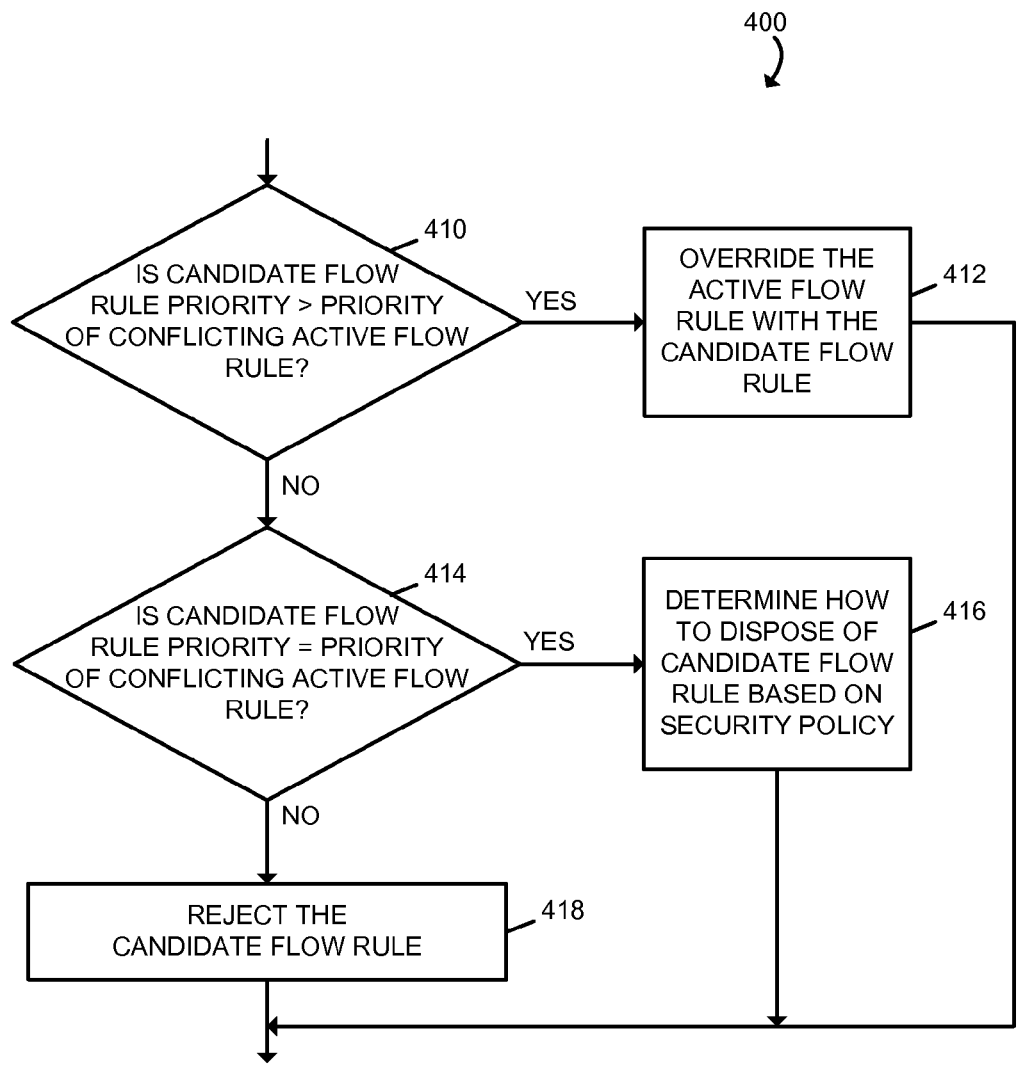
FIG. 4 is a simplified flow diagram of at least one embodiment of a method by which the security mediation service of FIG. 1 may resolve flow rule conflicts in accordance with a security policy.

Referring now to FIG. 4, the illustrative method 400 for resolving conflicts between the candidate flow rule and the conflicting active directives 168 is shown. The method 400 may be embodied as computerized programs, routines, logic and/or instructions of the computing system 710, e.g., as part of the conflict resolution module 182, for example. In block 410, the method 400 determines whether the role 160 of the candidate flow rule has greater priority than the role 160 of each conflicting active flow rule. If so, the method 400 branches to block 412, in which the method 400 overrides the active flow rule with the candidate flow rule. To do so, the method 400 may update the aggregate active state table 166 to purge the currently active flow rule and add the newly-approved packet disposition directive. Thus, packet disposition directives 154 issued from higher-priority security roles 160 may modify or replace already-existing, lower-priority flow rules, which may allow administrators and security-related network applications 110, 112 to define security policy and respond to active security threats.

Referring back to block 410, if the role 160 of the candidate flow rule is not of greater priority than the role 160 of the conflicting active flow rule, the method 400 advances to block 414. In block 414, the method 400 determines whether the role 160 of the candidate flow rule is equal in priority to the role 160 of the conflicting active flow rule. If the role priorities are equal, the method 400 branches to block 416, in which the method 400 determines how to dispose the candidate flow rule based on the network security policy. The security policy may be configured by an administrator of the dynamically programmable network 100 or by an administrator of the security mediation service 150, for example. In some embodiments, the candidate flow rule may override the active flow rule, effectively enforcing a "most recent" flow rule security policy. In other embodiments, the candidate flow rule may be rejected, thereby protecting the prior active flow rule from modification.

Referring back to block 414, if the role 160 of the packet disposition directive 154 is not of equal or greater priority to the role 160 of the conflicting active flow rule, then the method 400 advances to block 418. In block 418, the method 400 rejects the candidate flow rule. In such circumstances, the candidate flow rule has a lower priority than the currently active flow rules. Therefore, higher-priority flow rules may not be changed by conflicting packet disposition directives 154 issued from lower-priority security roles 160.

Aggregate Active State Manager

Figure 5:
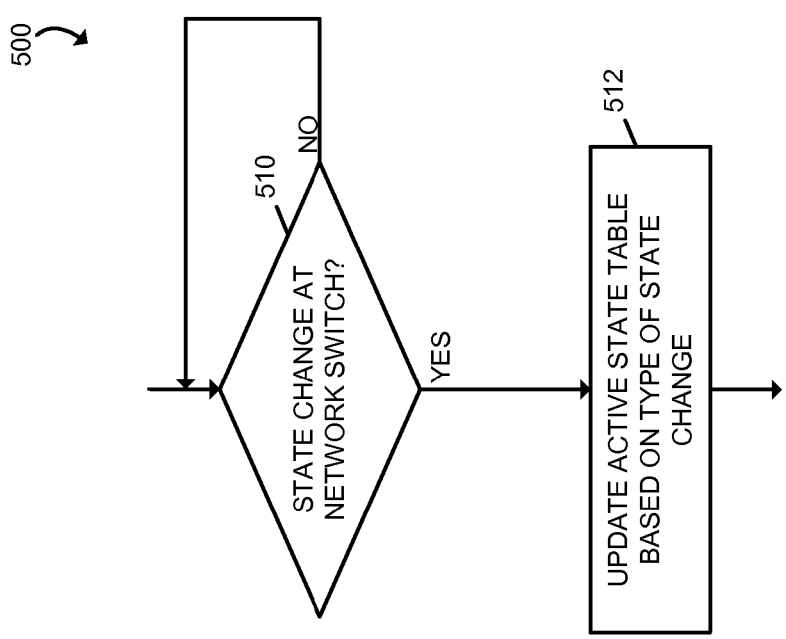
FIG. 5 is a simplified flow diagram of at least one embodiment of a method by which the security mediation service of FIG. 1 may manage data relating to currently active packet disposition directives.

Referring now to FIG. 5, an illustrative method 500 for managing the aggregate active state table 166 is shown. The method 500 may be embodied as computerized programs, routines, logic and/or instructions of the switch state change detection module 184, for example. The method 500 may execute asynchronously or concurrently with the other processes of the security mediation service 150. In block 510, the method 500 determines whether a state change has occurred at one of the network switches 132, 134, 136. In some embodiments, the switch state change detection module 184 may poll the network switches 132, 134, 136 for their status. In some embodiments, the switch state change detection module 184 may handle notifications received from the switches 132, 134, 136, for example by registering a callback function. The switches 132, 134, 136 may notify the security mediation service 150 whenever the content of the local flow tables 140 changes, for example, when a flow rule is deleted upon a timeout. In some embodiments, when communication with the switches 132, 134, 136 is lost, the switch state change detection module 184 may simulate the operation of the switches 132, 134, 136 and predict the expiration of flow rules. If a state change is not detected, the method 500 loops back to continue detecting state changes at block 510. If a state change is detected, the method 500 advances to block 512.

In block 512, the method 500 updates the aggregate active state table 166 based on the type of detected state change. For example, for a deletion event, the switch state change detection module may purge the associated entries in the aggregate active state table 166 to match the state of the network switches 132, 134, 136.

Source Authentication

Figure 6:
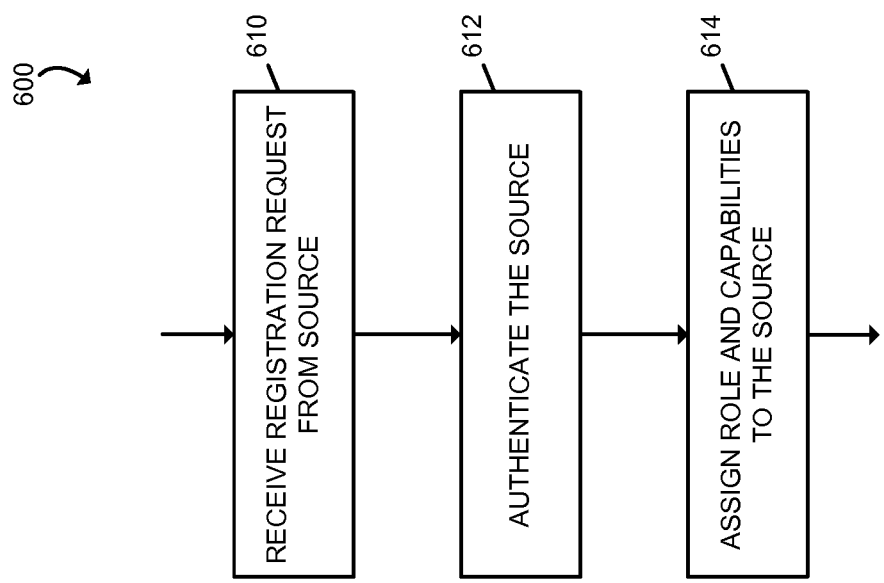
FIG. 6 is a simplified flow diagram of at least one embodiment of a method by which the security mediation service of FIG. 1 may register sources of packet disposition directives.

Referring now to FIG. 6, an illustrative method 600 for registering sources 158 of packet disposition directives 154 is shown. The method 600 may be embodied as computerized programs, routines, logic and/or instructions of the computing system 710, e.g., as part of the security mediation service 150, for example. The method 600 may be executed ahead of time or otherwise in an out-of-band fashion to prepare the security mediation service 150 to receive packet disposition directives 154.

The method 600 begins with block 610, in which the security mediation service 150 receives a registration request from a source 158. The registration request may identify the source 158, for example as a network application 110, 112 or as a network administrator. The registration request may present credentials associated with the source 158. Such credentials may include, for example, a digital signature or a public key associated with the source 158, which can be used to authenticate digitally-signed directives 154. In block 612, the method 600 authenticates the source 158. The method 600 may validate the credentials supplied by the source 158 to confirm the identity of the source 158. The method 600 may store the supplied credentials or data derived from the supplied credentials in the digital authentication content 164. In block 614, the method 600 updates the network security credentials table 156 to assign a role 160 and capabilities 162 to the source 158 based on, for example, information received during the source registration. In some embodiments, the source 158's role 160 and/or capabilities 162 may vary depending upon whether the source has supplied a digital signature or public key. In some embodiments, the source 158's role 160 and/or capabilities 162 may vary depending on a communication channel or an operating system process associated with the source 158. For instance, in some embodiments, a lower-priority role may be assigned to external network applications 112 and a higher priority role may be assigned to embedded network applications 110. As another example, a lower-priority role may be assigned to external applications 112 that communicate with the security mediation service 150 using an IPC proxy and IPC interface. As a further example, an unauthenticated source may have fewer capabilities 162 than a source 158 that has been successfully authenticated. The assignment of role 160 and capabilities 162 to sources 158 may depend on enterprise policy. In some embodiments, the assignment of roles 160 to sources 158 may be performed by a network administrator, e.g., during registration of the sources and/or prior to deployment of the dynamically programmable network 100.

Example Usage Scenarios

In one example, the security mediation service 150 can mediate "live" flow rule interactions between a reflector net and legacy network security applications; that is, as they occur. In this example, a network application 110 implements a "reflector net." The reflector net performs two basic operations: first, the reflector net detects an active malicious scanner. Second, upon detection of the active malicious scanner, the reflector net dynamically reprograms the network 100 to redirect all of the malicious scanner's flow into a remote honeynet. As a security-related application, the network application 110 is assigned an intermediate-priority security role 160, which is lower than the priority assigned to network administrators but higher than the priority assigned to non-security related applications.

Continuing this example, an external network application 112 implements an ordinary firewall using a legacy flow control interface to the security mediation service 150. The firewall implements the static security policy as defined by the network administrator for the network 100, and thus is associated with the highest-priority security role 160.

At runtime, the network application 110 may attempt to insert flow rules to redirect traffic based on detected threats from an already-firewalled remote host. These candidate flow rules may conflict with active flow rules previously inserted by the network application 112; for example, proposed redirect rules may conflict with deny rules of the firewall. If the new rules conflict, the firewall rules of the network application 112 should have the higher-priority role. Therefore, the security mediation service 150 will deny and prevent the implementation of such conflicting rules submitted by the network application 110.

Implementation Examples

Figure 7:
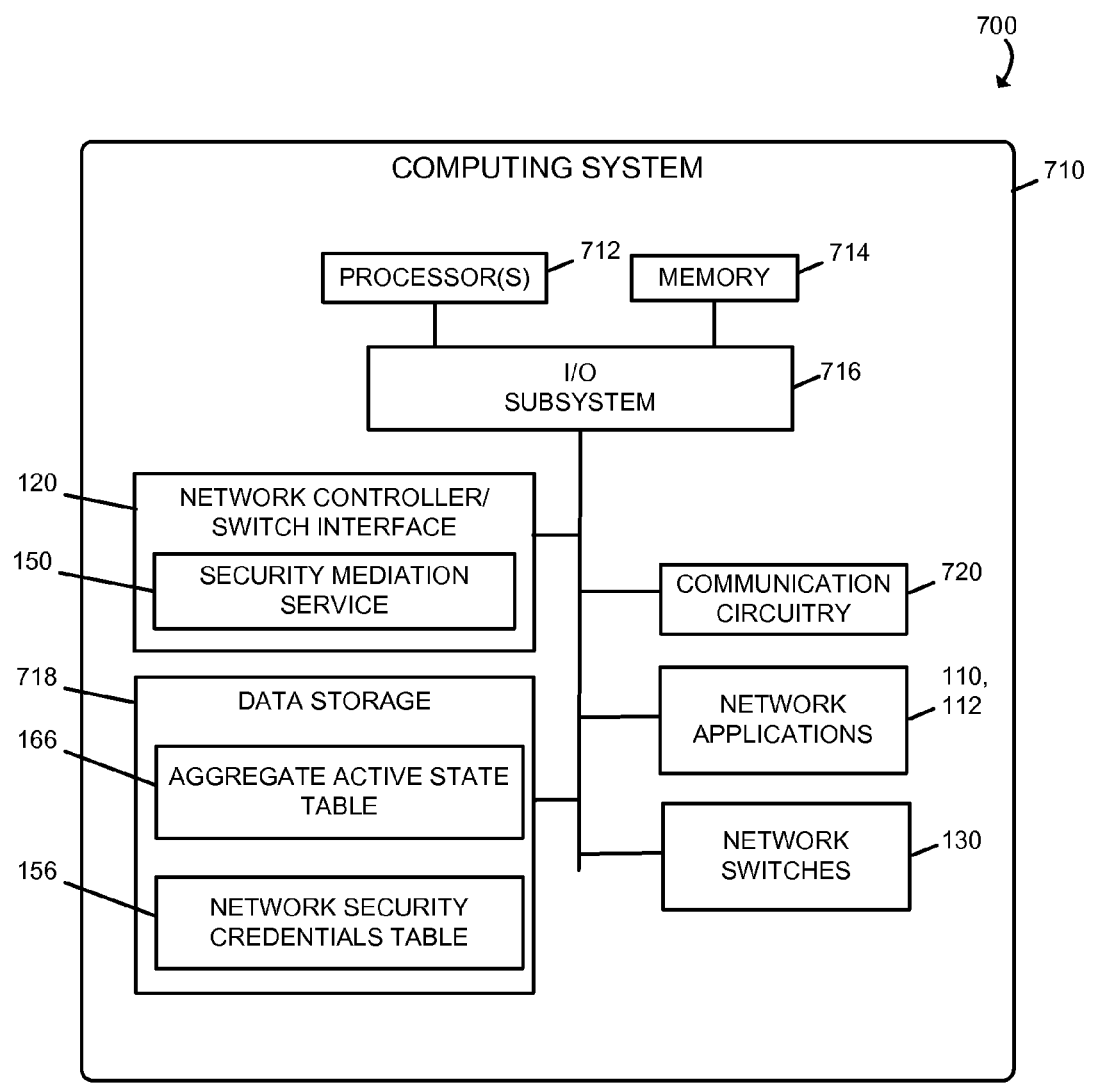
FIG. 7 is a simplified block diagram of an exemplary computing environment in connection with which at least one embodiment of the security mediation service of FIG. 1 may be implemented.

Referring now to FIG. 7, a simplified block diagram of an exemplary hardware environment 700 in which the security mediation service 150 may be implemented, is shown. The illustrative implementation 700 includes a computing system 710, which may implement the network controller/switch interface 120, the security mediation service 150, and/or one or more of the network security applications 110, 112 on a single computing device or multiple computing devices that are coupled to the network 100.

The illustrative computing system 710 includes at least one processor 712 (e.g. a microprocessor, microcontroller, digital signal processor, etc.), memory 714, and an input/output (I/O) subsystem 716. The computing system 710 may be embodied as any type of computing device(s) such as a personal computer (e.g., desktop, laptop, tablet, smart phone, body-mounted device, etc.), a server 190, an enterprise computer system, a network of computers, a combination of computers and other electronic devices, or other computing devices. Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to a number of components including one or more data storage devices 718 and communication circuitry 720. Although not specifically shown, one or more user input devices (e.g., keyboard, touch screen, etc.) and output devices (e.g., a display) may be coupled to the I/O subsystem 716 to allow a human operator, such as a network administrator, to, for example, establish and update a network security policy. The data storage 718 may include one or more hard drives or other suitable data storage devices (e.g., flash memory, memory cards, memory sticks, and/or others). In some embodiments, the aggregate active state table 166 and/or the network security credentials table 156 may reside in the storage media 718. In some embodiments, portions of systems software (e.g., an operating system, etc.), framework/middleware (e.g., APIs, object libraries, etc.), and/or the security mediation service 150 reside at least temporarily in the storage media 718. Portions of systems software, framework/middleware, and/or the security mediation service 150 may be copied to the memory 714 during operation of the computing system 710, for faster processing or other reasons. In some embodiments, portions of the security mediation service 150 may be distributed across multiple computing devices (e.g., servers 190) on the network 100.

The communication circuitry 720 communicatively couples the computing system 710 to a the network 100, which may be a local area network, wide area network, personal cloud, enterprise cloud, public cloud, and/or the Internet, for example. Accordingly, the communication circuitry 720 may include one or more wired or wireless network interface cards or adapters, for example, as may be needed pursuant to the specifications and/or design of the particular computing system 710. The communication circuitry 720 may be used by the network controller/switch interface 120 to communicate with the network switches 132, 134, 136 in order to control and define the dynamically programmable network 100. For example, the communication circuitry 720 may include one or more dedicated control channels for communication with one or more of the network switches 132, 134, 136.

The computing system 710 may include other components, sub-components, and devices not illustrated in FIG. 7 for clarity of the description. In general, the components of the computing system 710 are communicatively coupled as shown in FIG. 7 by electronic signal paths, which may be embodied as any type of wired or wireless signal paths capable of facilitating communication between the respective devices and components.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the security mediation service 150.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A security mediation service for a software-defined network, the security mediation service comprising a plurality of instructions embodied in one or more non-transitory machine accessible storage media and executable by a hardware processor, the instructions configured to, during a live operation of the network:
    determine a source of a packet disposition directive that may be implemented by one or more network switches of the software-defined network to change the behavior or configuration of the one or more network switches, wherein the source comprises one of a network administrator, a network switch, and a software application;
    determine whether to implement the packet disposition directive at the one or more network switches based on a current security policy of the live network and a priority of the source of the packet disposition directive;
    communicate the packet disposition directive to the one or more network switches in response to a determination that the packet disposition directive should be implemented at the one or more network switches;
    coordinate the communication of the packet disposition directive to the one or more network switches;
    wherein the security mediation service communicates the packet disposition directive to the one or more network switches before it communicates the packet disposition directive to a switch from which a communication was received that triggered the packet disposition directive; and
    wherein each of the one or more network switches has a local flow table and the security mediation service inserts the packet disposition directive in the local flow tables of the one or more network switches if the security mediation service determines that the packet disposition directive should be implemented at the one or more network switches.

2. The security mediation service of claim 1, wherein the instructions are configured to compare the priority of the source of the packet disposition directive to priorities that are associated with the sources of currently active packet disposition directives that currently control the flow of communications across the network, and to determine whether the packet disposition directive should be implemented at the network switch based on whether the priority of the source of the packet disposition directive has a higher priority than the sources of the currently active packet disposition directives.

3. The security mediation service of claim 2, wherein the priority is based at least in part on a communication channel used to communicate the packet disposition directive to the security mediation service.

4. The security mediation service of claim 2, wherein the priority is based at least in part on a process from which the packet disposition directive originated.

5. The security mediation service of claim 1, wherein the instructions are configured to determine whether to implement the packet disposition directive at the one or more network switches based on a priority associated with the source of the packet disposition directive, and wherein the priority is determined based at least in part on whether the source is a network administrator, a network security application, or another type of software application.

6. The security mediation service of claim 1, wherein the instructions are configured to determine whether to implement the packet disposition directive at the network switch based on a capability associated with the source of the packet disposition directive, and wherein the capability is based at least in part on whether the packet disposition directive is signed with a digital signature.

7. The security mediation service of claim 6, wherein the instructions are configured to use a public key to authenticate the source of the packet disposition directive and the capability is based at least in part on whether the source of the packet disposition directive is authenticated.

8. The security mediation service of claim 1, comprising instructions to prepare the packet disposition directive based on a network security policy associated with the source.

9. The security mediation service of claim 1, comprising instructions to maintain consistency between an aggregate table of currently active packet disposition directives across a plurality of network switches including one or more network switches and a local table of flow rules resident at the one or more network switches.

10. The security mediation service of claim 9, comprising instructions to communicate messages relating to the status of the local table of flow rules to the security mediation service.

11. The security mediation service of claim 1, wherein the instructions are to determine whether the packet disposition directive conflicts with one or more currently active packet disposition directives that currently control the flow of communications across the network.

12. The security mediation service of claim 1, wherein the packet disposition directive comprises one or more of: a directive to enable or disable one or more ports of the one or more network switches, a directive to request the one or more network switches to generate network traffic in response to a specified network condition, a flow rule to control network flows at the one or more network switches, and another type of directive that may change the behavior or configuration of the one or more network switches.

13. The security mediation service of claim 1, further comprising a network controller embodied in one or more non-transitory machine accessible storage media and configured to interface with software applications and with the one or more network switches.

14. The security mediation service of claim 1, further comprising a network virtualization layer embodied in one or more non-transitory machine accessible storage media and configured to interface with software applications and with the one or more network switches.

15. A method for enforcing a security policy for a software-defined computer network, the method comprising, with a computing system coupled to the network:
receiving a packet disposition directive from the network, wherein the packet disposition directive is configured to effect a change in the behavior or configuration of one or more network switches; and, during live operation of the software-defined network:
determining a priority associated with the packet disposition directive;
determining whether the packet disposition directive conflicts with a currently active network security policy, wherein the currently active security policy currently controls the behavior and configuration of the one or more network switches; and
in response to determining that the packet disposition directive conflicts with the currently active network security policy, determining whether to implement the packet disposition directive at the one or more network switches based on the priority associated with the packet disposition directive;
wherein the security mediation service is to communicate the packet disposition directive to the one or more network switches if the security mediation service determines that the packet disposition directive should be implemented at the one or more network switches and the security mediation service communicates the packet disposition directive to the one or more network switches before it communicates the packet disposition directive to a switch from which a communication was received that triggered the packet disposition directive, and
wherein the security mediation service is to coordinate the communication of the packet disposition directive to the one or more network switches, wherein the one or more network switches has a local flow table and the security mediation service inserts the packet disposition directive in the local flow tables of one or more network switches if the security mediation service determines that the packet disposition directive should be implemented at one or more network switches.

16. The method of claim 15, comprising determining whether a digital signature is associated with the packet disposition directive.

17. The method of claim 15, comprising, in response to determining that a digital signature is associated with the packet disposition directive, analyzing the digital signature associated with the packet disposition directive and determining a capability associated with the packet disposition directive based on the analysis of the digital signature, wherein the capability determines whether the packet disposition directive may effect a change in the behavior or configuration of the one or more network switches.

18. The method of claim 15, comprising determining a communication channel associated with the packet disposition directive and determining the priority based on the communication channel.

19. The method of claim 15, comprising identifying a source of the packet disposition directive and determining the priority based on the identity of the source.

* * * * *